Jan. 15, 1929.    G. JONES    1,699,070
METHOD AND APPARATUS FOR EFFECTING CHEMICAL REACTIONS
Filed May 9, 1927

Grinnell Jones  Inventor
By Frederick A. Norton.
Attorney

Patented Jan. 15, 1929.

1,699,070

UNITED STATES PATENT OFFICE.

GRINNELL JONES, OF CAMBRIDGE, MASSACHUSETTS.

METHOD AND APPARATUS FOR EFFECTING CHEMICAL REACTIONS.

Application filed May 9, 1927. Serial No. 189,965.

This invention relates to an improved method and apparatus for effecting chemical reactions. It relates further to an apparatus and method for the determination of the distribution ratio of a solute between two miscible solvents.

Heretofore it has been customary to determine such distribution ratios indirectly by the use of a third solvent immiscible with both of the other solvents. Thus, for example, in order to determine the distribution ratio of iodine between pure water and an aqueous solution of potassium iodide it has been necessary to use some solvent such as carbon bisulphide or carbon tetrachloride as an intermediary, and determine the distribution ratio of iodine between the immiscible solvent and each of the others and then compute the desired distribution ratio. But this indirect procedure is cumbersome and laborious and introduces two serious difficulties; while the solvents are commonly considered immiscible in each other, they are, as a matter of fact, slightly soluble in each other, and this mutual solubility affects the distribution ratio. Moreover, a complete separation of the two layers for analysis is often difficult owing to emulsification, and this may cause serious errors, especially if the distribution ratio differs substantially from unity. For example, the distribution ratio of iodine between carbon bisulphide and water is about 585, so that the merest trace of emulsified carbon bisulphide in the water layer gives rise to serious errors in the analysis.

I have overcome these difficulties by the invention of a device in which, for example, a body of water and a separate body of potassium iodide solution are brought into equilibrium with each other with respect to dissolved iodine through the vapor phase so that the vapor pressure of iodine from the two solutions becomes identical. After equilibrium has been established, the vapor pressure, and therefore also the activity of the free iodine in the potassium iodide solution must be the same as the activity of the free iodine in the water, and since the latter is a very dilute solution of a non-electrolyte, its activity is sensibly the same as the concentration which may be readily and accurately determined by titration.

An object of my invention is to provide a method for effecting chemical reactions of the character described.

Another object of my invention is to provide an apparatus for the purpose designated.

A further object of my invention is to provide such an apparatus which is of simple design and sturdy construction and susceptible of a variety of uses as will be shown more fully hereinafter.

With these and other objects in view which may be incidental to my improvements, the invention consists in the parts and combinations to be hereinafter set forth and claimed, with the understanding that the several necessary elements comprising my invention, may be varied in construction, proportions and arrangement without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings the same numerals refer to similar parts throughout the several views, of which, Fig. 1 is a showing partly in section and partly in elevation of an equilibrator comprising my invention mounted for rotation in a constant temperature bath;

Figures 5, 6:
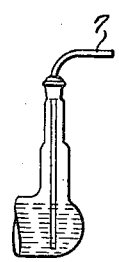
Fig. 5 is a detail showing of the emptying siphon.
Fig. 6 is a broken section of the upper part of the bath showing a heating device and thermostatic control therefor.

Referring now to the drawings, numerals 1 and 2 designate glass vessels or chambers which are interconnected at each end by glass tubes 3 and 4 to form a unitary device. The vessels are so constructed and arranged that they make an angle of substantially 14 degrees with each other. The tubes 3 and 4 are each provided with a ground glass stopper 5 and 6 respectively, to facilitate filling and emptying the system. The stoppers may be replaced at the end of a run by delivery tubes 7 as shown in Fig. 5. The delivery tubes are ground to fit their respective openings as is customary in devices of this character. The connecting tubes permit free circulation of vapor but prevent mixing of the solutions. They are bent inward and upward as shown, particularly in Figs. 2, 3 and 4, so that centrifugal force and gravity will help to prevent spattering. The equilibrator is mounted in a bracket 8, which may be of brass or any other suitable material. The bracket is attached to rotatable shaft 10 by suitable means, such as knurled screw 9. The shaft is positioned so as to bisect the angle between the parts 1 and 2 of the equilibrator. The shaft is then mounted so that it can revolve in bearings 11 and 12 of the supporting bracket and at an angle with the vertical which is adjustable. The bracket comprises an arm 13 which is secured to a side 14 of steel tub 15 by appropriate means, such as bolts or rivets 16. The bearing 11 is adjustably attached to the arm 13 by bolt 17. Intermediate of its length the arm is slotted as at 18, to provide a channel for the adjustable bolt 19 of movable arm 20. Bearing 12 is adjustably attached to the movable arm by bolt 21. As will readily be appreciated, the angle of the shaft with the vertical can be easily adjusted by loosening bolt 19 and sliding it either forward or back in slot 18 to any desired position. This movement determines the angular relation between the fixed and movable arms of the bracket, and, consequently, the position of the shaft with respect to the vertical. I have found that in order to secure the best results the angle of this member with respect to the vertical should be greater than one half the angle between the two glass tubes. I have also ascertained that the preferable working position of the apparatus is that in which the glass vessels are set at an angle of 14 degrees to each other and the shaft is mounted so that the angle between it and the vertical is substantially 11 degrees. It is to be understood, however, that I do not intend to be limited to any particular degree of angularity between the members, since it is clear that my invention comprehends the assemblage in all operative positions. The shaft is connected for rotation with a driving shaft 22 through a flexible coiled torsion spring 23. The spring is secured to the shafts by collars 24 provided with set screws 25. I prefer to use phosphor bronze for the torsion spring, but any material having suitable properties can be used. In place of the torsion spring I may use a universal joint of any well known construction.

The driving shaft is mounted for rotation in bearing 26 which is supported by bifurcated bracket 27. This bracket is provided with a depending leg 28 which is secured to the wall of the tub by bolts 29. A grooved pulley 30 is fastened to the driving shaft and is adapted to rotate therewith. A belt 31 connects the pulley with another grooved pulley 32 which is mounted for rotation on a shaft 33. The shaft 33 is supported in an elongated bearing 34 which is mounted in the wall of the tub as shown, and extends into the tub for a purpose to be hereinafter described. Exteriorly positioned with respect to pulley 32, is a pulley 35 having a plurality of grooves, which is secured to the shaft by any suitable means such as collar 36 and set screw 37 and is connected through belt 38 to grooved pulley 39. This pulley is secured to motor shaft 40 by collar 41 and its associated set screw 42. It will readily be appreciated that the motor shaft may be directly connected to the driving shaft, and any variations in speed desired secured by varying the speed of the motor and the position of the drive belt 38 in the pulley 35.

The apparatus is provided with a stirring device which comprises paddle members 43 secured to cross arms 44 of shaft 45, the whole mounted for rotation in bearings 46 and 47. The vanes may be secured to the cross arms by any suitable means, such as rivets 43' or they may be integral therewith. The bearing 46 is secured to the bottom of the tub by any suitable means, not shown. Bearing 47 is fixedly attached to an extension 48 of bracket 49. The extension is attached to the bracket by bolts 50, and the bracket in its turn is secured to the wall of the tub by bolts 51. The extension is provided with an upstanding member 52 in which is positioned a bearing 54 which journals shaft 33. Shafts 33 and 45 are provided at their adjacent ends with intermeshing bevel gears 55 and 56 respectively.

Bearings 34 and 54 are in alignment to prevent any stresses being imposed upon shaft 33 when it is in motion. All the parts adapted to operate in contact with liquid are preferably made of phosphor bronze, although any suitable material may be used.

By the arrangement thus provided, I am enabled to circulate any fluid in the tub while the equilibrator is rotated. This circulation of fluid maintains all parts of the bath at a uniform temperature.

If it is desired to operate at 0° C., I provide a reticulated circular container 57, having a perforated bottom portion 58, the whole being made of wire netting or any suitable material. This container is kept filled with ice which imparts the desired temperature to the system. If it is desired to operate at a higher temperature, I may use an electric heater 59 and an associated thermostatic control 60 which can be set for the temperature desired. These elements may be of any of the well known constructions now available and are shown diagrammatically in Fig. 6. To prevent loss of heat through the walls of the tub I prefer to lag it with an insulating material 61, which may be made of felt or any other substance having the desired properties. I may also provide an insulated cover for the apparatus, not shown.

This device is particularly adapted for carrying out operations of the general type set forth. As has already been described, the device comprises a closed glass apparatus without mechanical valves and contains no liquid to produce seals except the two liquids under investigation and yet by mere rotation causes a continuous circulation of gas or vapor so that it bubbles through the two solutions for as long as the rotation continues. The constant variation in the level of the liquids in the vessels gives rise to a pulsating effect with a resulting circulation of the gas or vapor as described. An equality in the vapor pressure of the common volatile constituent is thus ensured between the two separated liquid phases. After the desired equilibrium has been established the liquids may be withdrawn from the system by removing the stoppers and inserting the siphons 7 into the vessels. The two solutions are then separately available for analysis and for any tests or measurements upon them which may be desired, such as: density, refractive index, color or light absorption, electrical conductivity, the determination of $p_H$ values with indicators or hydrogen electrodes, or for use in cells for determining electromotive force with any other suitable electrode.

In operation, the shaft is revolved slowly (about sixteen revolutions per minute), and there is a continuous circulation of gas through the apparatus, bubbling in turn through the liquids in vessels 1 and 2, thus ensuring that eventually the common volatile solute will attain the same vapor pressure from the two solutions in the vessels. The time required to attain a state of equilibrium will depend on the size and shape of the apparatus (which may, of course, have any desired capacity), the vapor pressure of the solute, and the concentration of the solutions and must, therefore, be determined in each special case. With my apparatus revolving at the rate of sixteen times per minute, equilibrium was secured with iodine in 24 hours at 25° C., and in 48 hours at 0° C. This period of time can, of course, be considerably reduced by starting with solutions at approximately the equilibrium concentrations. No appreciable spattering occurs when the apparatus is rotated as above described. Sudden starting or stopping of the apparatus should be avoided because the momentum of the liquids may carry them over the peak of the connecting tubes 3 and 4. For alkaline liquids which foam badly, any suitable type of trap or spray catcher, not shown, may be introduced or incorporated in the connecting tubes.

Under ordinary conditions, the liquids in the vessels are in fluid connection through the air which overlies them, and it is this fluid which acts as a carrier for the volatile solute when the apparatus is rotated. In certain reactions, the presence of the oxygen of the air may be undesirable, due to its reactivity, and it may be replaced by a non-reactive fluid or gas having the desired characteristics, such as nitrogen, argon or the like.

While I have described and shown an apparatus made of glass, it will be readily understood that any suitable material, such as an appropriate sheet metal, may be substituted therefor if operating conditions permit. The capacity of the equilibrator is susceptible of modification to accommodate any desired quantity of reagents, and by the use of the stainless or corrosion resisting metals now available, commercial or semi-commercial units may be constructed and operated to carry out reactions of the type described by way of illustration.

This apparatus makes it possible to determine the distribution ratio of any volatile solvent between two miscible non-volatile solvents, whereas the direct method of determining distribution ratios is necessarily applicable only to immiscible solvents. Partial mutual solubility of the two solvents seriously complicates the interpretation of the data and therefore, if the solvents are sufficiently non-volatile, the new device comprising my invention may be used with advantage also with solvents which are incompletely miscible. A particularly important field of usefulness is for the determination of the distribution ratio of a volatile solute between a pure solvent (not necessarily non-volatile) and a solution of any non-volatile solute in the same solvent.

As exemplifying the types of reactions which can be suitably carried out in my apparatus, the following cases are to be noted, it being understood that these are given by way of example and I do not limit myself thereto. The apparatus is suitable for the study of the distribution of carbon dioxide between water and any salt of carbonic acid from which conclusions as to the concentration, or more strictly, of the activity of the free acid in the solutions of its salts may be drawn, and hence, the dissociation constant of the acid can be computed. Similarly, the distribution of sulfur dioxide between water and solutions of its salts can be studied. Likewise, the amount of free ammonia formed by the hydrolysis of any of its salts can be found and the dissociation constant of the acid determined. Or, again, the equilibrium between ammonia and its complex compounds of the type $Ag(NH_3)_2$ can be determined.

Figure 1:
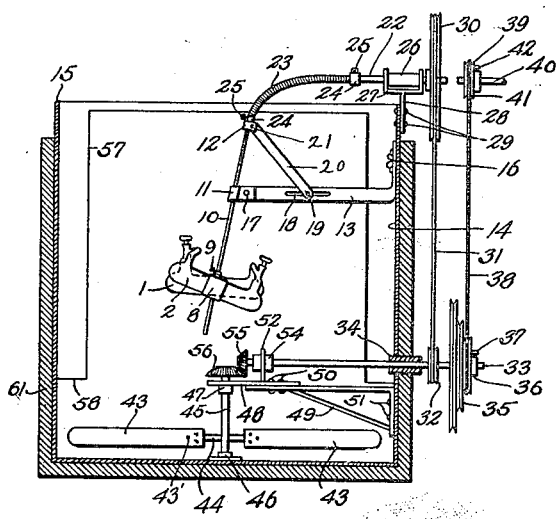
Figure 2:
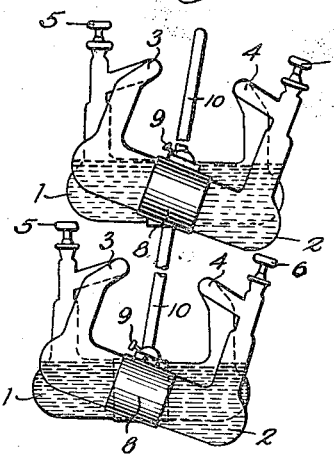
Fig. 2 is a showing of a plurality of equilibrators mounted on a common shaft.
Figures 3, 4:
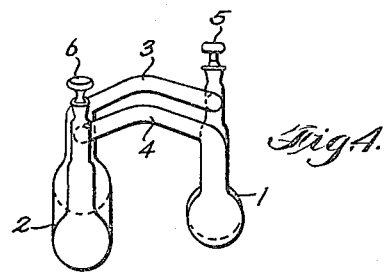
Fig. 3 is a top plan view of the equilibrator.
Fig. 4 is an end view of the equilibrator.

If it is desired to use the apparatus as an extractor, say of moisture, concentrated sulphuric acid may be placed in one tube and any substance placed in the other tube will have its moisture extracted more quickly than in a dessicator. Instead of circulating a gas or vapor through the system, I may replace the vapor phase entirely by a third liquid which is insoluble in and lighter than the two liquids in the vessels.

Where it is desired to determine the distribution ratios of a volatile solute between a series of non-volatile solvents, I may use a plurality of the devices comprising my invention mounted on a common shaft as shown in Fig. 2. The conditions of the reaction being thus maintained absolutely uniform, both as to temperature and time, the results obtained will, of necessity, be strictly comparable. It may be desired, for example, to determine the distribution ratio of iodine in solutions of potassium iodide of varying strengths. All that will be needed is to place the solutions of varying concentrations in one set of tubes and a common solute in the other set and subject the assembly to the conditions of the experiment. A direct comparison will be obtained by analyzing the resulting water-iodine components of the systems. Another comparative test which is given by way of example, is that involving the distribution ratio of iodine in the systems $NaI-H_2O$ and $KI-H_2O$.

As has already been intimated, I may use any volatile solute, such as $Br$, $NH_4$, $CO_2$, etc., and the specific example of iodine is merely illustrative of volatile solutes generally.

It will now be appreciated that I have devised an apparatus which comprises a valveless, closed system through which a fluid may be circulated by simple rotation of the whole apparatus. This circulation is obtained without the aid of any of the conventional mechanical devices such as pistons, rotors, etc. While this apparatus has been described in its particular application to sundry chemical operations, it will be appreciated that it may be utilized wherever it is desired to cause a circulation of fluid through the parts of a connected system.

I claim:

1. A method of determining the distribution ratio of a volatile solute, comprising the recycling of a non-reactive fluid through separate bodies of a solution of the solute and a pure solvent in a closed system, until an equilibrium is set up in the solutions with respect to the volatile solute.

2. A method of determining the distribution ratio of a volatile solute, which comprises cycling a gaseous fluid through separate bodies of a solution of the solute and a pure solvent in a closed system, until an equilibrium is set up in the solution with respect to the volatile solute.

3. A method of determining the distribution ratio of a common volatile solute between a plurality of miscible solvents, which comprises cycling a gaseous fluid through the separated solvents in a closed system under determined conditions of temperature.

4. A method of determining the distribution ratio of a common volatile solute between a plurality of miscible solvents, which comprises cycling a gaseous fluid through the separated solvents in closed systems under determined conditions of temperature and time of reaction.

5. The method of circulating a fluid, comprising admitting a predetermined quantity of liquid to separated and angularly disposed containers in fluid communication with each other, and rotating the assembly at an angle to the vertical.

6. A system for effecting a determination of the distribution ratio of a common volatile solute in a plurality of miscible solvents, comprising, in combination, a plurality of valveless pulsating pumps mounted for synchronous rotation in a constant temperature bath, a plurality of miscible solvents in each of the valveless pulsating pumps, a gaseous medium bridging the solvents in each valveless pulsating pump and adapted to cycle through the solvents when the assembly is rotated.

7. A system for distributing a common volatile solute in a plurality of miscible solvents, comprising, in combination, a plurality of valveless pulsating pumps mounted for synchronous rotation in a constant temperature bath, and a plurality of miscible solvents in each of the valveless pulsating pumps, the solvents being maintained out of contact with each other.

8. A valveless, pulsating pump comprising a pair of interconnected vessels angularly disposed with respect to each other, a separate body of liquid in each vessel substantially filling the same, a gaseous medium overlying the liquid, a supporting shaft for the assembly bisecting the angle between the vessels and mounted for rotation at an angle from the vertical whereby the gaseous medium is adapted to circulate through the liquids when the assembly is rotated.

9. A valveless, pulsating pump comprising a pair of interconnected vessels angularly disposed with respect to each other, a body of liquid in each vessel substantially filling the same, a gaseous medium overlying the liquids and in contact with them, and a supporting shaft for the assembly mounted for rotation at an angle from the vertical.

10. A valveless, pulsating pump comprising a pair of interconnected vessels angularly disposed with respect to each other, a body of liquid in each vessel substantially filling the same, a supporting shaft for the assembly bisecting the angle between the vessels, said shaft being mounted for rotation at an angle from the vertical.

11. A valveless, pulsating pump comprising a pair of interconnected vessels angularly disposed with respect to each other at an angle of substantially fourteen degrees, a supporting shaft therefor bisecting the angle therebetween, said shaft being mounted for rotation at an angle from the vertical of about eleven degrees.

12. A valveless, pulsating pump comprising a pair of interconnected, angularly disposed vessels mounted for rotation on a shaft member, said shaft being maintained at an angle of substantially eleven degrees from the vertical.

13. An apparatus for effecting a cyclic flow of fluid comprising a valveless pulsating pump.

14. An apparatus for effecting a cyclic flow of fluid comprising a valveless pulsating pump including a plurality of communicating containers.

15. An apparatus for effecting a cyclic flow of fluid comprising a valveless pulsating pump including a plurality of communicating containers and forming a closed system.

16. In a closed system for effecting chemical equilibria, in combination, a plurality of chambers, a plurality of connections disposed between the chambers, separate liquids in the respective chambers out of contact with each other, and fluid means adapted to cycle through the separate liquids.

17. An apparatus of the character described comprising a container adapted to receive a bath, agitating means in the bath, a valveless pulsating pump mounted for rotation in the bath, and means to operate the agitator and pump.

18. An apparatus of the character described comprising an insulated container adapted to receive a bath, a thermostatic control for the bath, agitating means for the bath, a valveless pulsating pump mounted for rotation in the bath, and means to operate the agitator and valveless pulsating pump.

In testimony whereof I affix my signature.

GRINNELL JONES.